United States Patent
Freshour

(10) Patent No.: US 9,016,134 B2
(45) Date of Patent: Apr. 28, 2015

(54) CIRCULAR LOAD CELL STRAIN SENSOR CONFIGURATION

(71) Applicant: Goodrich Corporation, Charlotte, NC (US)

(72) Inventor: Thomas Freshour, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 228 days.

(21) Appl. No.: 13/710,973

(22) Filed: Dec. 11, 2012

(65) Prior Publication Data
US 2014/0157906 A1 Jun. 12, 2014

(51) Int. Cl.
*G01L 1/00* (2006.01)
*G01L 5/28* (2006.01)
*G01L 5/00* (2006.01)

(52) U.S. Cl.
CPC ................ *G01L 5/28* (2013.01); *G01L 5/0004* (2013.01)

(58) Field of Classification Search
CPC ........................................................ G01L 1/00
USPC ............................................................ 73/774
See application file for complete search history.

(56) References Cited

U.S. PATENT DOCUMENTS

| | | | | |
|---|---|---|---|---|
| 3,871,216 A | * | 3/1975 | Eder | 73/862.635 |
| 5,284,062 A | * | 2/1994 | Ryffel | 73/768 |
| 7,677,117 B2 | * | 3/2010 | Perriard et al. | 73/862.626 |
| 7,683,274 B2 | * | 3/2010 | Dellac et al. | 177/211 |
| 7,793,551 B2 | * | 9/2010 | Shimazu et al. | 73/777 |
| 2006/0266561 A1 | | 11/2006 | Dellac et al. | |

FOREIGN PATENT DOCUMENTS

| | | |
|---|---|---|
| EP | 504676 A | 9/1992 |
| GB | 2305729 A | 4/1997 |
| JP | 2010159548 A | 7/2010 |
| WO | 2012035245 A1 | 3/2012 |

OTHER PUBLICATIONS

Extended European Search Report for EP13195804.3, dated Mar. 31, 2014.

* cited by examiner

*Primary Examiner* — Lisa Caputo
*Assistant Examiner* — Octavia D. Hollington
(74) *Attorney, Agent, or Firm* — Kinney & Lange, P.A.

(57) ABSTRACT

A load cell extending in an axial direction having an outer surface includes a groove in the outer surface having a first flat wall, and a second flat wall; and a principal strain sensor positioned on the first flat wall to measure tension and compression in the axial direction.

18 Claims, 4 Drawing Sheets

CIRCULAR LOAD CELL STRAIN SENSOR CONFIGURATION

BACKGROUND

The present invention is related to electromechanical brake systems, and in particular to circular load cells for electric brake actuators.

Electromechanical brakes for aircraft often comprise stator discs and rotor discs. The stator discs are coupled to an axle and do not rotate relative to the axle. The rotor discs are coupled to, and rotate with the wheel, relative to the axle. An electric brake actuator is utilized to apply force to one of the stator discs to compress the stator portion with the rotor portion of the brake. This creates friction that converts kinetic energy into thermal energy in order to slow the rotation of the wheel. In order to better control the actuator, it is desirable to know the force that is being applied to the stator disc by the actuator.

In the past, load cells have been used to determine stresses and strains experienced by the actuator when applying force to the stator disc. These actuators are often circular in shape and thus, measuring devices placed upon the outer diameter of the load cell to measure axial compression and tension will experience bending and hoop stresses, which can cause wear of the device over time. It is desirable to reduce the bending and hoop stresses experienced by the measuring devices implemented on circular load cells.

SUMMARY

A load cell extending in an axial direction having an outer surface includes a groove in the outer surface, and a principal strain sensor. The groove has a first flat wall, and a second flat wall. The principal strain sensor is positioned on the first flat wall to measure tension and compression in the axial direction.

DETAILED DESCRIPTION

The present invention relates to reducing stress on strain sensors for circular load cells. An electric brake actuator is used to apply a force to a stator portion of a brake in order to compress the stator portion with the rotor portion of the brake. This creates friction to convert kinetic energy to thermal energy to slow down the rotation of the wheel. A load cell is implemented within the brake actuator to measure axial tension and compression to determine the load of the actuator while applying force to the stator portion of the brake. The load cell may have a circular shape with an outer diameter and may also be a ring or toroid with an inner diameter depending on the application. The load cell includes eight strain sensors for measuring the axial strain on the load cell. Four of the strain sensors are principal sensors and four of the strain sensors are transverse sensors. Grooves are cut out of the outer diameter every ninety degrees circumferentially around the load cell. The grooves each contain two side walls and a flat surface between the two side walls. The principal strain sensors are positioned along the flat between the two side walls and oriented to measure strain in the axial direction. The transverse sensors are placed vertically upon one of the two side walls. The eight strain sensors are electrically connected in a wheatstone bridge configuration. The wheatstone bridge is connected to a data acquisition module. By placing the strain sensors on the flat surfaces of the grooves, the traditional bending and hoop stresses experienced on the outer diameter of the circular load cell are eliminated.

Figure 1:
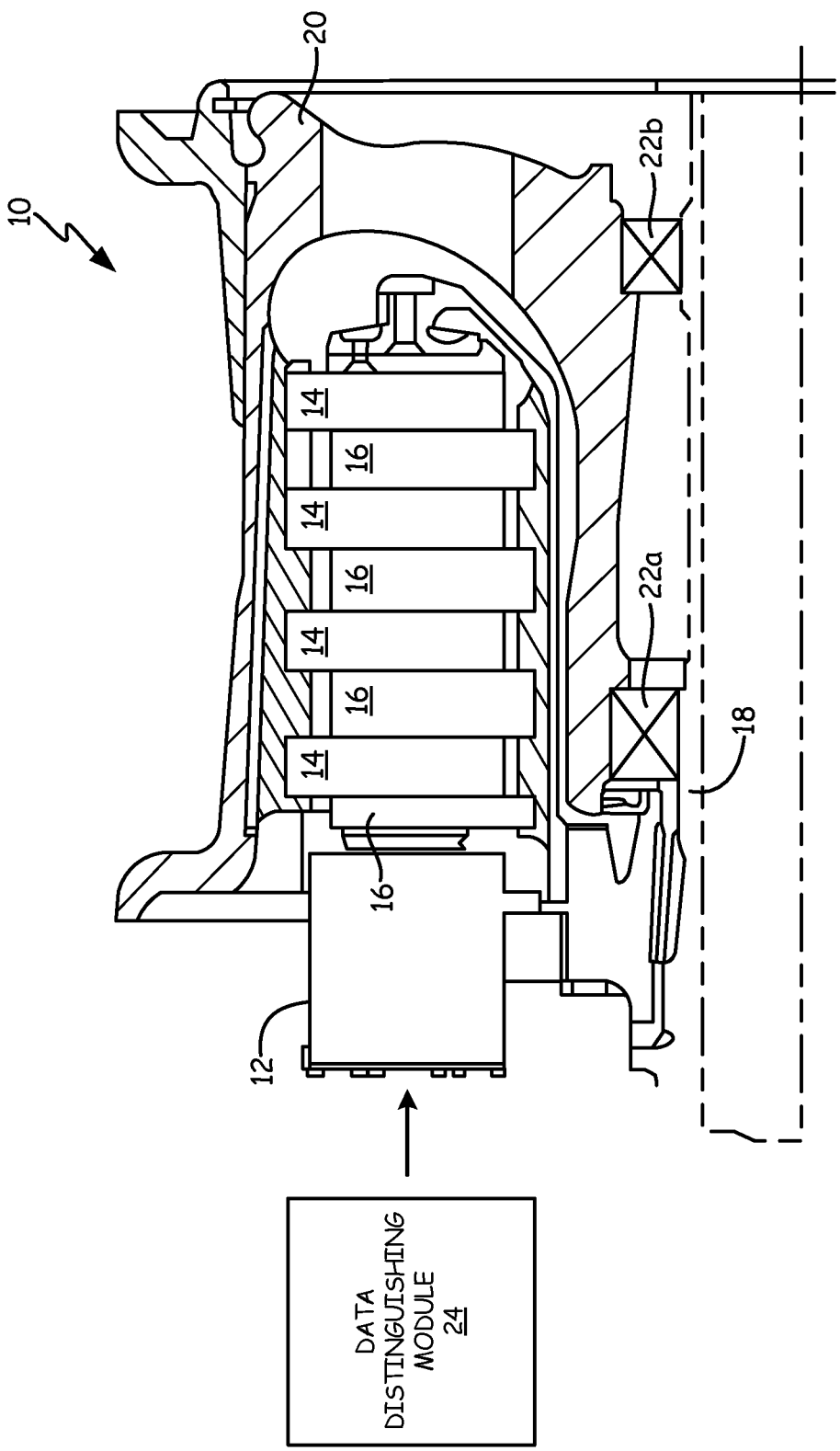
FIG. 1 is a cross-section view illustrating an electromechanical brake system according to an embodiment of the present invention.

FIG. 1 illustrates an electromechanical brake system 10, which includes electric brake actuator 12, rotor discs 14, stator disks 16, axle 18, wheel 20, bearings 22a and 22b, and data acquisition module 24. Wheel 20 rotates about axle 18 on bearings 22a and 22b. Electric brake actuator 12 is utilized to apply a force to the closest of stator discs 16. Stator discs 16 are coupled to, and do not rotate relative to axle 18. Rotor discs 14 are coupled to, and rotate with wheel 20. When force is applied by electric actuator 12 to stator discs 16, friction is generated between stator discs 16 and rotor discs 14, converting kinetic energy to thermal energy in order to slow down the rotation of wheel 20. Electric brake actuator 12 electrically measures and communicates the load it experiences to data acquisition module 24. Data acquisition module 24 is any module capable of receiving and storing electronic signals from electric brake actuator 12.

Figure 2:
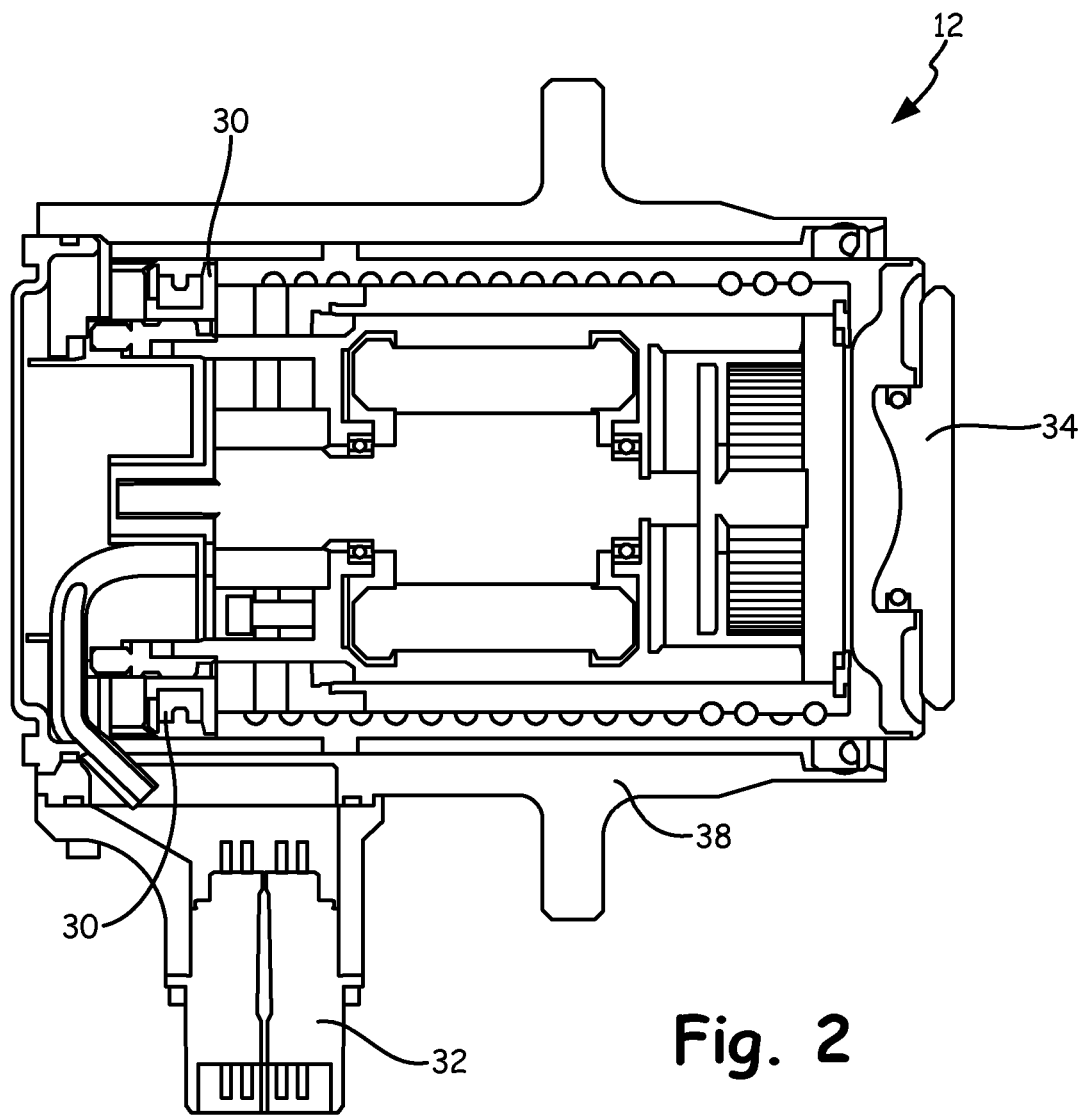
FIG. 2 is a cross-section view illustrating an electric brake actuator for an electromechanical brake system according to an embodiment of the present invention.

FIG. 2 illustrates electric brake actuator 12, which includes load cell 30, communications port 32, ram 34 and housing 36. The portion of electric brake actuator 12 within housing 36 extends to apply force to stator discs 16 of FIG. 1 through ram 34. Communications port 32 is utilized to communicate electrical signals between electric brake actuator 12 and other electrical systems such as, for example, a brake control unit or data acquisition module 24.

Load cell 30 converts a mechanical load into an electrical output. When ram 34 applies a force to the first of stator discs 16 of FIG. 1, a reactive force is mechanically transmitted from ram 34 back to load cell 30. Load cell 30 provides an electrical signal representative of this reactive force to data acquisition module 24 of FIG. 1 through communications port 32.

Figure 3:
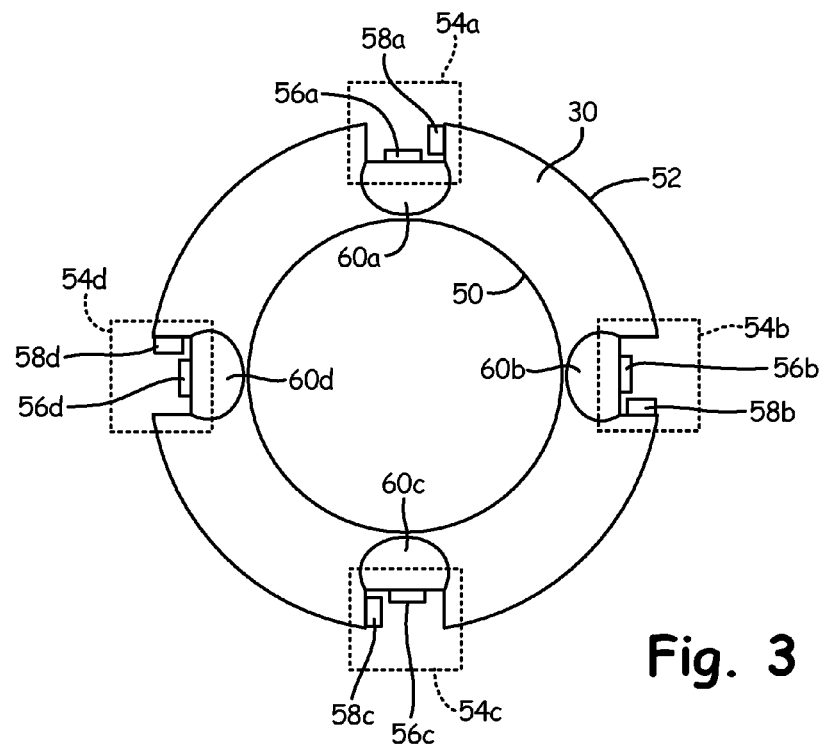
FIG. 3 is a front view illustrating a load cell for an electric brake actuator according to an embodiment of the present invention.

FIG. 3 illustrates load cell 30, which includes inner diameter 50 and outer diameter 52. Outer diameter 52 includes grooves 54a-54d. Each groove 54a-54d includes a principal strain sensor 56a-56d, and a transverse strain sensor 58a-58d respectively. Between inner diameter 50 and each groove 54a-54d, is a pad 60a-60d respectively. Each pad 60a-60d is attached to the surface of load cell 30 between inner diameter 50 and each groove 54a-54d in order to better transmit the load to principal strain sensors 56a-56d. Load cell 30 includes inner diameter 50, for example, in order to better fit within electric brake actuator 12 of FIGS. 1 and 2. In other embodiments, load cell 30 may not include an inner diameter 50. The difference in diameter between inner diameter 50 and outer diameter 52 is any difference necessary to accommodate load cell 30 within electric brake actuator 12 or any other application such as, for example, one half inch (1.77 centimeters). The depth of each groove 54a-54d is any depth between outer diameter 52 and inner diameter 50 such as, for example, one-quarter inch (0.885 centimeters). Principal strain sensors

56a-56d are utilized to measure tension and compression in the axial direction of load cell 30. Transverse strain sensors 58a-58d are used to account for temperature changes and unexpected stresses on load cell 30.

Figure 4:
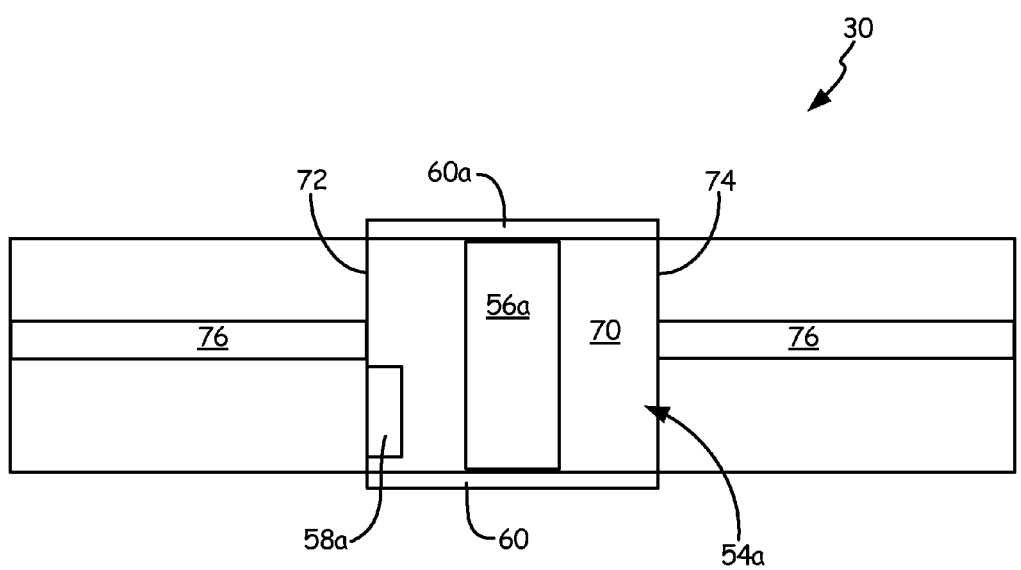
FIG. 4 is a top view of a groove of a circular load cell according to an embodiment of the present invention.

FIG. 4 illustrates a top view of load cell 30 showing groove 54a. Groove 54a includes base 70, side walls 72 and 74, principal sensor 56a, transverse sensor 58a, pads 60a and 62a, and is connected to circumferential wire groove 76 in the outer surface 52 of load cell 30. Groove 54a, principal sensor 56a, transverse sensor 58a, and pads 60a and 62a are representative of each of grooves 54a-54d, principal strain sensors 56a-56d, transverse strain sensors 58a-58d and pads 60a-60d of FIG. 3, respectively. Pad 62a is also representative of each of four pads that are associated with grooves 54a-54d and are not visible in FIG. 3.

Principal sensor 56a is utilized to measure the tension and compression between pads 60a and 62a. Principal sensor 56a is any electric strain sensor such as, for example, a general purpose strain gage. In another embodiment, pad 62a may be omitted, and principal sensor 56a is only connected to pad 60a, while still measuring tension and compression in the same direction.

Transverse sensor 58a is used to compensate for temperature changes and other unexpected stresses upon principal sensor 56a. Transverse sensor 58a is mounted to side wall 72 and is positioned perpendicular to principal sensor 56a. This is so transverse sensor 58a does not measure any of the compression and tension between pads 60a and 62a.

Figure 5:
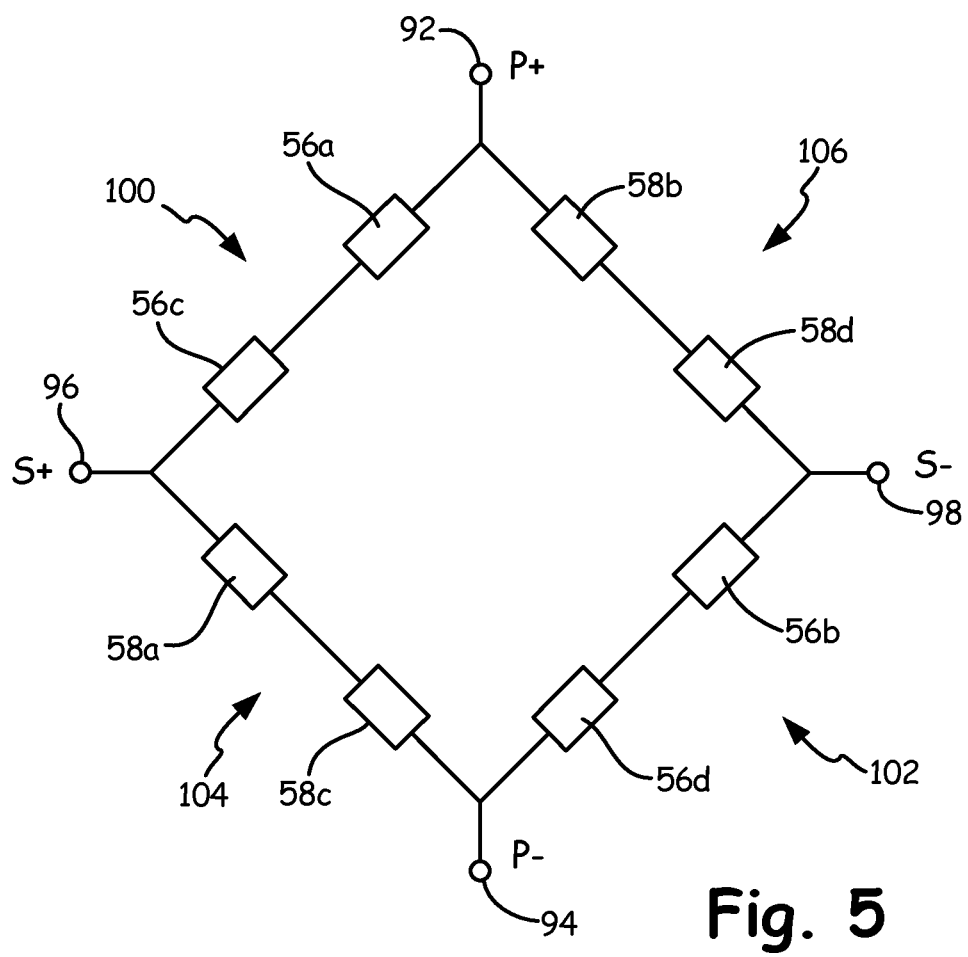
FIG. 5 is a circuit diagram illustrating a strain sensor configuration according to an embodiment of the present invention.

FIG. 5 is a circuit diagram illustrating a bridge circuit 90 according to an embodiment of the present invention. Bridge circuit 90 includes positive power terminal 92, negative power terminal 94, positive signal terminal 96, and negative signal terminal 98. The locations of principal sensors 56a-56d and transverse sensors 58a-58d of FIG. 3 are shown in bridge circuit 90.

Bridge 90 is a wheatstone bridge with two legs 100 and 102 having principal sensors and two legs 104 and 106 having transverse sensors. Power is provided to the strain sensors through positive signal terminal 96. When a load is experienced by electric actuator 12, the resistances of principal sensors 56a-56d change, creating an electric potential across signal terminals 96 and 98. When no load is experienced, the potential at both signal terminals 96 and 98 are equal, creating no voltage across the terminals. This signal is representative of the axial stress on load cell 30 and may be trimmed or provided as is to data acquisition module 24 of FIG. 1. This signal does not change with temperature or other unexpected stresses due to the configuration of transverse strain sensors 58a-58d because the temperature change or stress will affect the resistances of all strain sensors 56a-56d and 58a-58d equally.

The following are non-exclusive descriptions of possible embodiments of the present invention.

A load cell extending in an axial direction having an outer surface includes, among other things: a first groove in the outer surface, the first groove defined by a first flat wall, and a second flat wall, and a first principal strain sensor positioned on the first flat wall of the first groove to measure tension and compression in the axial direction.

The load cell of the preceding paragraph can optionally include, additionally and/or alternatively, any one or more of the following features, configurations and/or additional components.

A first transverse strain sensor positioned on the second flat wall perpendicular to the first principal strain sensor.

The load cell is included within an electric brake actuator of an aircraft landing gear.

The load cell is a ring including the outer surface and an inner diameter.

A pad positioned between the first flat wall of the first groove and the inner diameter, wherein the pad is connected to the first principal strain sensor.

A second groove in the outer surface, the second groove defined by a first flat wall, and a second flat wall, a second principal strain sensor positioned on the first flat wall of the second groove to measure tension and compression in the axial direction, a third groove in the outer surface, the third groove defined by a first flat wall, and a second flat wall, a third principal strain sensor positioned on the first flat wall of the third groove to measure tension and compression in the axial direction, a fourth groove in the outer surface, the fourth groove defined by a first flat wall, and a second flat wall, and a fourth principal strain sensor positioned on the first flat wall of the fourth groove to measure tension and compression in the axial direction.

The first groove, second groove, third groove and fourth groove are circumferentially spaced 90° apart around the outer surface.

A first transverse strain sensor positioned on the second flat wall of the first groove perpendicular to the first principal strain sensor, a second transverse strain sensor positioned on the second flat wall of the second groove perpendicular to the second principal strain sensor, a third transverse strain sensor positioned on the second flat wall of the third groove perpendicular to the third principal strain sensor, and a fourth transverse strain sensor positioned on the second flat wall of the fourth groove perpendicular to the fourth principal strain sensor.

The first, second, third and fourth strain sensors and the first, second, third, and fourth transverse sensors are configured in a wheatstone bridge with a power input, and a signal output.

The wheatstone bridge includes a first leg that includes the first and second principal strain sensors, a second leg that includes the first and second transverse strain sensors, a third leg that includes the third and fourth principal strain sensors, and a fourth leg that includes the third and fourth transverse strain sensors.

The signal output is connected to a data acquisition module that calculates the load of the electric actuator based upon the signal output.

A circumferential groove in the outer surface that holds wires for connecting the first, second, third and fourth principal strain sensors.

An electromechanical brake system includes, among other things: an electric actuator that applies force to a stator disc of a brake, a load cell that measures load of the electric actuator, the load cell including a first groove in an outer surface of the load cell, the first groove defined by a first flat surface and a second flat surface, and a first principal strain sensor on the first flat surface of the first groove.

The system of the preceding paragraph can optionally include, additionally and/or alternatively, any one or more of the following features, configurations and/or additional components.

The load cell further comprises a first transverse strain sensor on the second flat surface of the first groove.

The load cell is a ring including the outer surface and an inner diameter, the load cell further including a pad positioned between the first flat surface and the inner diameter, wherein the pad is connected to the first principal strain sensor.

A second groove in the outer surface, the second groove defined by a first flat wall, and a second flat wall, a second principal strain sensor positioned on the first flat wall of the second groove to measure tension and compression in the axial direction, a third groove in the outer surface, the third groove defined by a first flat wall, and a second flat wall, a third principal strain sensor positioned on the first flat wall of the third groove to measure tension and compression in the axial direction, a fourth groove in the outer surface, the fourth groove defined by a first flat wall, and a second flat wall, and a fourth principal strain sensor positioned on the first flat wall of the fourth groove to measure tension and compression in the axial direction.

The first, second, third, and fourth grooves are circumferentially spaced 90° apart around the outer surface.

A first transverse strain sensor positioned on the second flat wall of the first groove perpendicular to the first principal strain sensor, a second transverse strain sensor positioned on the second flat wall of the second groove perpendicular to the second principal strain sensor, a third transverse strain sensor positioned on the second flat wall of the third groove perpendicular to the third principal strain sensor, a fourth transverse strain sensor positioned on the second flat wall of the fourth groove perpendicular to the fourth principal strain sensor.

The first, second, third, and fourth principal strain sensors and the first, second, third, and fourth transverse strain sensors are configured in a wheatstone bridge with a power input, and a signal output.

The wheatstone bridge includes a first leg that includes first and second of the four principal strain sensors, a second leg that includes first and second of the four transverse strain sensors, a third leg that includes third and fourth of the four principal strain sensors, and a fourth leg that includes third and fourth of the four transverse strain sensors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A load cell extending in an axial direction having an outer surface, the load cell comprising:
   a first groove in the outer surface, the first groove defined by a first flat wall, and a second flat wall, wherein the load cell is a ring including the outer surface and an inner diameter;
   a first principal strain sensor positioned on the first flat wall of the first groove to measure tension and compression in the axial direction; and
   a pad positioned between the first flat wall of the first groove and the inner diameter, wherein the pad is connected to the first principal strain sensor.

2. The load cell of claim 1, further comprising:
   a first transverse strain sensor positioned on the second flat wall perpendicular to the first principal strain sensor.

3. The load cell of claim 1, wherein the load cell is included within an electric brake actuator of an aircraft landing gear.

4. The load cell of claim 1, further comprising:
   a second groove in the outer surface, the second groove defined by a first flat wall, and a second flat wall;
   a second principal strain sensor positioned on the first flat wall of the second groove to measure tension and compression in the axial direction;
   a third groove in the outer surface, the third groove defined by a first flat wall, and a second flat wall;
   a third principal strain sensor positioned on the first flat wall of the third groove to measure tension and compression in the axial direction;
   a fourth groove in the outer surface, the fourth groove defined by a first flat wall, and a second flat wall; and
   a fourth principal strain sensor positioned on the first flat wall of the fourth groove to measure tension and compression in the axial direction.

5. The load cell of claim 4, wherein the first groove, second groove, third groove and fourth groove are circumferentially spaced 90° apart around the outer surface.

6. The load cell of claim 4, further comprising:
   a first transverse strain sensor positioned on the second flat wall of the first groove perpendicular to the first principal strain sensor;
   a second transverse strain sensor positioned on the second flat wall of the second groove perpendicular to the second principal strain sensor;
   a third transverse strain sensor positioned on the second flat wall of the third groove perpendicular to the third principal strain sensor; and
   a fourth transverse strain sensor positioned on the second flat wall of the fourth groove perpendicular to the fourth principal strain sensor.

7. The load cell of claim 6, wherein the first, second, third and fourth strain sensors and the first, second, third, and fourth transverse sensors are configured in a wheatstone bridge with a power input, and a signal output.

8. The load cell of claim 7, wherein the wheatstone bridge comprises:
   a first leg that includes the first and second principal strain sensors;
   a second leg that includes the first and second transverse strain sensors;
   a third leg that includes the third and fourth principal strain sensors; and
   a fourth leg that includes the third and fourth transverse strain sensors.

9. The load cell of claim 7, wherein the signal output is connected to a data acquisition module that calculates the load of the electric actuator based upon the signal output.

10. The load cell of claim 4, further comprising a circumferential groove in the outer surface that holds wires for connecting the first, second, third and fourth principal strain sensors.

11. An electromechanical brake system comprising:
   an electric actuator that applies force to a stator disc of a brake;
   a load cell that measures load of the electric actuator, wherein the load cell is a ring including an outer surface and an inner diameter, the load cell comprising:
     a first groove in the outer surface of the load cell, the first groove defined by a first flat surface and a second flat surface;
     a first principal strain sensor on the first flat surface of the first groove; and
     a pad positioned between the first flat surface and the inner diameter, wherein the pad is connected to the first principal strain sensor.

12. The system of claim 11, wherein the load cell further comprises a first transverse strain sensor on the second flat surface of the first groove.

13. The system of claim 11, wherein the load cell further comprises:

a second groove in the outer surface, the second groove defined by a first flat wall, and a second flat wall;

a second principal strain sensor positioned on the first flat wall of the second groove to measure tension and compression in the axial direction;

a third groove in the outer surface, the third groove defined by a first flat wall, and a second flat wall;

a third principal strain sensor positioned on the first flat wall of the third groove to measure tension and compression in the axial direction;

a fourth groove in the outer surface, the fourth groove defined by a first flat wall, and a second flat wall; and a fourth principal strain sensor positioned on the first flat wall of the fourth groove to measure tension and compression in the axial direction.

14. The system of claim 13, wherein the first, second, third, and fourth grooves are circumferentially spaced 90° apart around the outer surface.

15. The system of claim 13, further comprising:

a first transverse strain sensor positioned on the second flat wall of the first groove perpendicular to the first principal strain sensor;

a second transverse strain sensor positioned on the second flat wall of the second groove perpendicular to the second principal strain sensor;

a third transverse strain sensor positioned on the second flat wall of the third groove perpendicular to the third principal strain sensor; and a fourth transverse strain sensor positioned on the second flat wall of the fourth groove perpendicular to the fourth principal strain sensor.

16. The system of claim 15, wherein the first, second, third, and fourth principal strain sensors and the first, second, third, and fourth transverse strain sensors are configured in a wheatstone bridge with a power input, and a signal output.

17. The system of claim 16, wherein the wheatstone bridge comprises:

a first leg that includes first and second of the four principal strain sensors;

a second leg that includes first and second of the four transverse strain sensors;

a third leg that includes third and fourth of the four principal strain sensors; and a fourth leg that includes third and fourth of the four transverse strain sensors.

18. A load cell extending in an axial direction having an outer surface, the load cell comprising:

a first groove in the outer surface, the first groove defined by a first flat wall, and a second flat wall;

a first principal strain sensor positioned on the first flat wall of the first groove to measure tension and compression in the axial direction;

a second groove in the outer surface, the second groove defined by a first flat wall, and a second flat wall;

a second principal strain sensor positioned on the first flat wall of the second groove to measure tension and compression in the axial direction;

a third groove in the outer surface, the third groove defined by a first flat wall, and a second flat wall;

a third principal strain sensor positioned on the first flat wall of the third groove to measure tension and compression in the axial direction;

a fourth groove in the outer surface, the fourth groove defined by a first flat wall, and a second flat wall; and a fourth principal strain sensor positioned on the first flat wall of the fourth groove to measure tension and compression in the axial direction.

\* \* \* \* \*